United States Patent [19]

Haas

[11] 4,144,063

[45] Mar. 13, 1979

[54] COLORED IMAGE FORMATION FROM MALEIMIDE COPOLYMERS

[75] Inventor: Howard C. Haas, Arlington, Mass.

[73] Assignee: Polaroid Corporation, Cambridge, Mass.

[21] Appl. No.: 507,257

[22] Filed: Sep. 18, 1974

Related U.S. Application Data

[63] Continuation-in-part of Ser. No. 374,945, Jun. 29, 1973, abandoned.

[51] Int. Cl.² .......................... G03C 5/54; G03C 5/16; C08G 69/44; C08G 73/76
[52] U.S. Cl. .................................. 96/29 D; 250/316; 526/52.1; 526/52.3; 526/52.4; 526/52.5; 526/52.2; 526/262

[58] Field of Search ................... 96/29 D; 260/78 SC; 250/316

[56] References Cited

U.S. PATENT DOCUMENTS

| 2,313,565 | 3/1943 | McDowell et al. | 260/96 R |
| 2,983,606 | 5/1961 | Rogers | 96/29 D |
| 3,184,309 | 5/1965 | Minsk et al. | 96/29 D |
| 3,488,706 | 1/1970 | Cohen et al. | 96/29 D |
| 3,639,357 | 2/1972 | Cohen | 96/87 A |

Primary Examiner—Richard L. Schilling
Attorney, Agent, or Firm—Esther A. H. Hopkins

[57] ABSTRACT

This invention relates to methods of generating colored images by treatment of maleimide copolymers with ammonia or organic amines.

5 Claims, 1 Drawing Figure

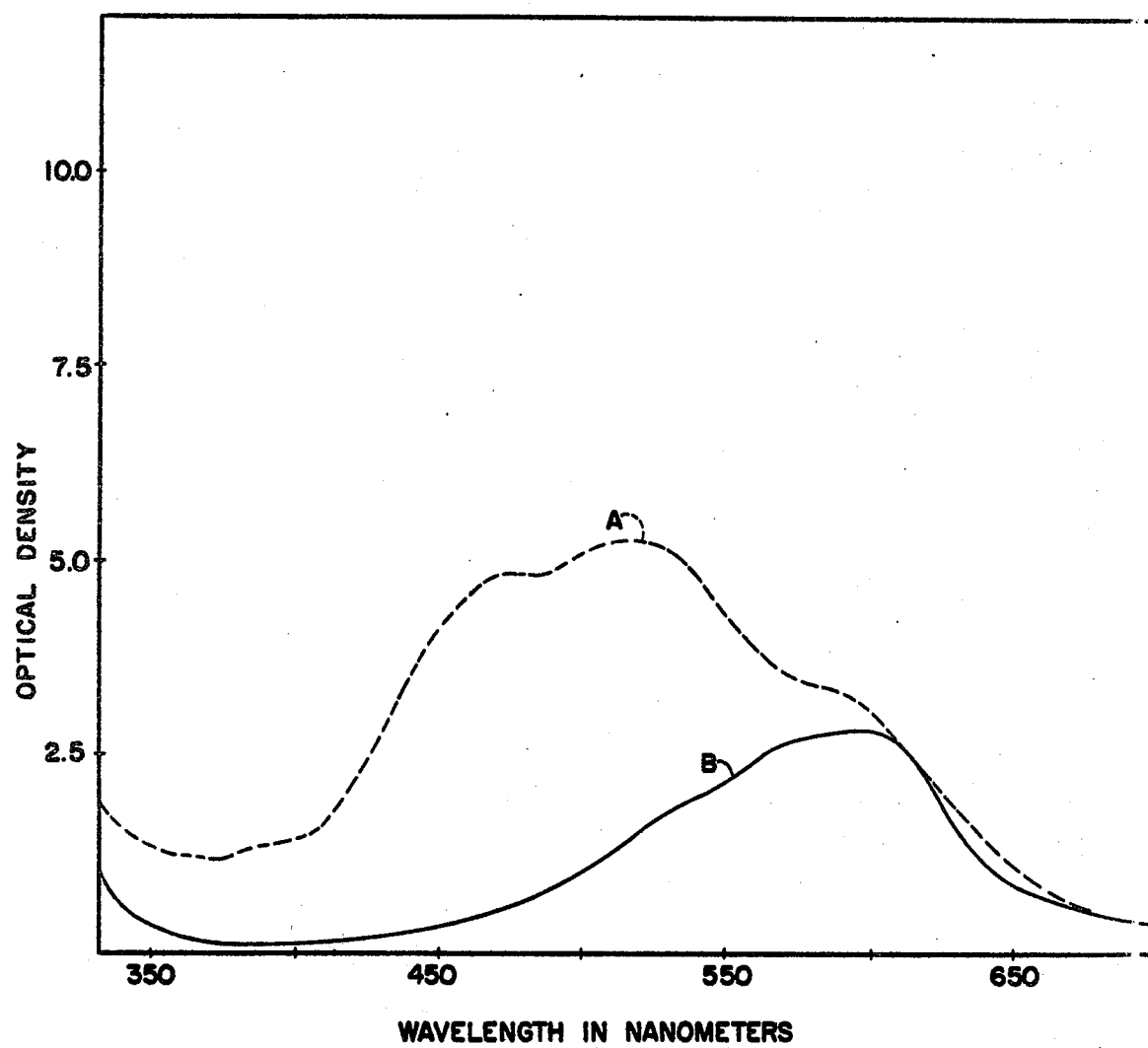

COLORED IMAGE FORMATION FROM MALEIMIDE COPOLYMERS

This is a continuation-in-part of Ser. No. 374,945, filed June 29, 1973 now abandoned, and is related to Ser. No. 507,047, now abandoned.

The invention relates to processes for generating colored images or tangible representations of configurations by the interaction of certain maleimide copolymers and certain bases.

BACKGROUND OF THE INVENTION

Several colored systems involving maleimides or their homopolymers are known. These colored systems include homopolymers wherein the polymerization was initiated by anionic initiators, and radical-initiated homopolymers suspended in strongly basic media. These colored systems also include certain cyclic unsaturated imides acted upon by alkaline reagents. Some of the colors produced in these systems are evanescent. The color produced by alkaline treatment of a given homopolymer is specific and limited.

One of the objects of this inventions is to provide a new process for generating a colored image.

Yet another object is to provide a process wherein the specific color obtained may be varied and the intensity of the color controlled.

Still another object is to provide a novel heat-sensitive copy process utilizing the reaction between a copolymer comprising a maleimide and a nucleophile bearing vinyl monomer, and ammonia or an organic amine.

Other objects of this invention will in part be obvious and will in part appear hereinafter.

The invention accordingly comprises the process involving the several steps and the relation and order of one or more such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIG. 1 is a graphic illustration of the spectral absorption characteristics of the products of two of the copolymers of this invention upon treatment with dimethyl-ethanolamine.

DETAILED DESCRIPTION OF THE INVENTION

The copolymers utilized in this invention comprise two types of vinyl monomers; the first, corresponding to the formula:

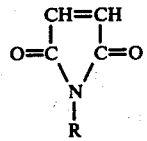

are maleimides wherein R may be hydrogen or any monovalent organic radical which has no deleterious effect on the copolymerization reaction. This organic radical may be aromatic or aliphatic and its size may be chosen to control the intensity of the color obtained, since for a given weight of copolymer the larger the percentage weight taken up by the R group the more dilute the color that will be obtained upon treatment of the copolymer with the base. It should be understood that the size or composition of R is not critical in the process within the scope of this invention beyond these limitations. The second vinyl monomer must have substituted on at least one carbon of the carbon-carbon double bond a radical capable of forming a stable anion which is characterized by an unshared pair of electrons. The word "anion" is used in the sense of the definition in Webster's Third New International Dictionary (1961) as "a negatively charged ion." The atom of such a radical directly bonded to the carbon in the carbon-carbon double bond is preferably halogen, oxygen, sulfur or nitrogen. A general formula is $CH_2=CHX$ where X is the radical capable of forming a stable anion. Suitable second vinyl monomers are, for example, vinyl acetate, methyl-α-chloro-acrylate, α-acetoxystyrene, β-acetoxystyrene, vinyl benzoate, vinyl formate, and vinylene carbonate. The anions formed from the illustrative second vinyl monomers are: from vinyl acetate, the anion $CH_3COO^-$, from methyl-α-chloro-acrylate, the anion $Cl^-$, from α-acetoxystyrene, the anion $CH_3COO^-$, from β-acetoxystyrene, the anion $CH_3COO^-$, from vinyl benzoate, the anion $C_6H_5COO^-$, from vinyl formate, the anion $HCOO^-$ and from vinylene carbonate, the anion $-CH=CHOCOO^-$. The colors obtained upon treatment of the copolymers of this invention with the bases of this invention can be varied by the choice of the radical on this second vinyl monomer inasmuch as this second vinyl monomer determines the composition of the copolymer as well as the sequence length distribution of monomeric units in the backbone.

Ammonia or organic amines with basic ionization constants at least as large as that of ammonia may be used in this invention. Examples of bases within the scope of the present invention are ammonia, benzylamine, diethylamine, diethyltriamine, ethylamine, guanidine, N-methylethanolamine, tri-N-n-butylamine and triethylamine.

For the purposes of this invention, "forming a colored image" means producing color formation in a substrate.

For convenience, free radical initiation was used in preparing the copolymers used as examples. Other methods of polymerization initiation might also be used, and it is not to be construed that preparation of these well-known copolymers by other mechanisms is beyond the scope of this invention.

It has now been discovered that treating the above-mentioned copolymers with certain specified bases results in the development of color. The following is suggested as a mechanism to explain the formation of the chromophoric product, but it is to be understood that neither the product of the treatment, nor the process itself, is limited by this proposed mechanism. It is postulated that in the reaction of the base with the copolymer to give the color, the ionization of the hydrogen atom alpha to the imide carbonyl, and the nucleophilic displacement of the stable anion is followed by the ionization of an allylic hydrogen atom. The reaction of maleimide/vinyl acetate for example would be postulated to proceed thusly:

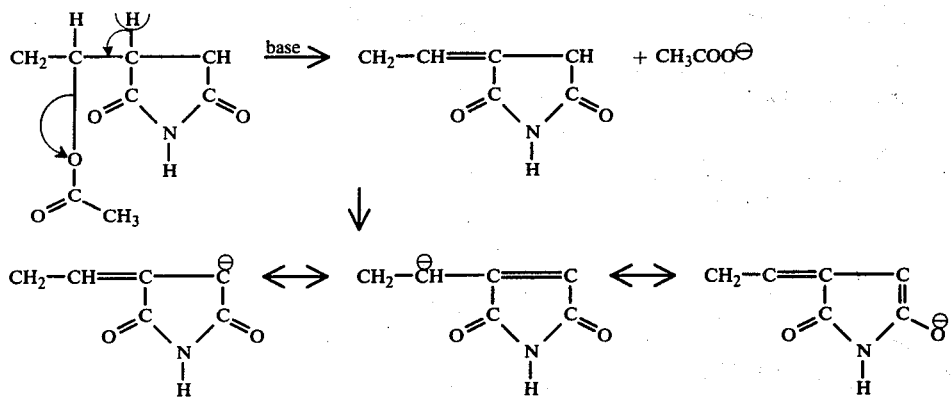

Any structural modification that would boost the acidity of the α-hydrogen atom (without introducing other complicating effects) would be expected to accelerate the elimination.

Advantage may be taken of differences in basicity (relative extent to which bases accept hydrogen ion from water) of the bases used in this invention by incorporating one of the weaker bases initially into the film of the copolymer and initiating the color-producing reaction by using heat. Heat may be used in another way to initiate the color-producing reaction. This is done by incorporating an amine precursor which yields the amine on heating, for example, a salt of the specified amine, into a cast film of the copolymer and initiating the color-producing reaction by heat, applying said heat only in certain portions of said film if so desired. An illustration of such an amine salt is an amine carbonate.

Examples of copolymers which exhibit the ability to undergo color change on treatment according to this invention are: maleimide/vinyl benzoate; maleimide/vinylene carbonate; maleimide/vinyl formate; N-ethylmaleimide/vinyl acetate; maleimide/methyl α-chloroacrylate; maleimide/α-acetoxystyrene; maleimide/β-acetoxystyrene; and maleimide/vinyl acetate.

Two or more of these copolymers may be admixed in order to produce differing colors upon treatment.

A particularly useful system for forming color images is by diffusion transfer as described, for example, in U.S. Pat. No. 2,983,606. In such a system, a photosensitive element comprising at least one silver halide layer having an organic amine developer (an organic amine which is also a silver halide developing agent) associated therewith (in the same or in an adjacent layer) is developed by applying an aqueous alkaline processing composition. Exposed and developable silver halide is developed by the organic amine developer which in turn becomes oxidized to provide an oxidation product which is appreciably less diffusible than the unreacted organic amine developer, thereby providing an imagewise distribution of diffusible organic amine developer in terms of unexposed areas of the silver halide layer, which imagewise distribution is then transferred, at least in part, by diffusion, to an image-receiving layer of the film unit which is adapted to receive solubilized image-forming material by having incorporated into it a copolymer as defined by this invention.

In a diffusion transfer system of the foregoing description, color images are obtained by exposing a photosensitive element or "negative component" comprising at least a light-sensitive layer, e.g., a gelatino silver halide emulsion layer, having a image-providing material associated therewith in the same or in an adjacent layer, to form a developable image; developing this exposed element with a processing composition to form an imagewise distribution of a soluble and diffusible image-providing material; and transferring this imagewise distribution, at least in part, by diffusion, to a superposed receiving element or "positive component" comprising at least a stratum incorporating a copolymer of this invention to impart to this stratum a transfer image. An example of an organic amine developer encompassing a silver halide developing group is 1-amino-2-(p-hydroxy anilino) propane hydrochloride, which can be prepared by the method of Fourneau, Bull. Soc. Chim. 11 141-8 (1944).

EXAMPLE 1

A copolymer of maleimide and vinyl acetate was prepared by heating 1 g. of maleimide (0.0103 m) and 1 g. of vinyl acetate (0.0116 m) in 4 mls. of purified dioxane containing 4 mgs. of benzoyl peroxide at 60° C. under vacuum in a sealed tube for 24 hours. The copolymer, purified by several reprecipitations from dioxane into hexane and dried, had a nitrogen content of 7.80% corresponding to a maleimide mole fraction of 0.51. Treatment of 20 mg. solid samples of this copolymer with dilute aqueous solutions of various bases followed by heating on a watch glass over a steam cone resulted in the colors tabulated in Table I.

TABLE I

MALEIMIDE/VINYL ACETATE COPOLYMER-AQUEOUS BASE COLOR PRODUCTION

| BASE | COLOR |
|---|---|
| Ammonia | Light Blue |
| Diethylene Triamine | Light Blue-Green |
| Triethylamine | Blue |
| Ethylamine | Dark Blue |
| Diethylamine | Dark Blue |
| N-methylethanolamine | Dark Blue |
| Benzylamine | Blue-Black |

EXAMPLE 2

A copolymer of maleimide and vinylene carbonate was prepared by heating 1 g. of maleimide (0.0103 m) and 1 g. of vinylene carbonate (0.0116 m) in 4 mls. of purified dioxane containing 8 mgs. of azobisisobutyronitrile at 60° C. under vacuum in a sealed tube for 24 hours. The copolymer, purified by reprecipitation from dioxane into hexane and dried, had a nitrogen content of 11.0% corresponding to a maleimide mole fraction of 0.87. 50 mgs. of the copolymer was dissolved in γ-butyrolactone, 1 ml. of dimethylethanolamine added and the solution diluted to 10 mls. with γ-butyrolactone. This solution had an intense ultraviolet absorption and exhibited a maximum in the visible range at 525 nm in the graphic representation of optical density as a function of wavelength, as seen in FIG. 1 curve A.

EXAMPLE 3

A copolymer of maleimide and vinyl acetate was prepared, dissolved and treated as in Example 2. This solution had an intense ultraviolet absorption and exhibited a maximum in the visible range at 600 nm in the graphic representation of optical density as a function of wavelength, as seen in FIG. 1 curve B.

EXAMPLE 4

One half gram of maleimide/vinyl acetate copolymer (theoretical composition: 52.4% carbon; 4.91% hydrogen; 7.65% nitrogen; 35.0% oxygen) was dissolved in 6 mls. of purified tri-n-butylamine and the solution heated at 170° C. for 8 hours under nitrogen. The tri-n-butylamine was stripped off under vacuum and the remaining blue-gray solid was extracted with hexane and dried. The product is soluble in formamide, dimethyl sulfoxide, or hot γ-butyrolactone, and is partially soluble in pyridine. The color of the blue-gray solid is bleached to a light pink when treated with aqueous hydrochloric acid. Aqueous sodium hydroxide restores the color. Elemental analysis of the blue-gray solid showed 55.88% carbon; 5.43% hydrogen; 10.04% nitrogen and 28.65% oxygen by difference. The theoretical elemental composition of the product resulting from the complete removal of acetic acid from a 1/1 copolymer of maleimide and vinyl acetate is 58.50% carbon; 4.06% hydrogen; 11.40% nitrogen and 26.04% oxygen. Comparison of the carbonyl stretching at 1770 cm$^{-1}$ in the infrared spectra of the maleimide/vinyl acetate copolymer and the blue-gray product obtained from treatment with tri-n-butylamine indicates that the maleimide ring remains intact. The large decrease in the intensity of the —C—O— stretching vibration of the acetate group (1230 cm$^{-1}$) indicates elimination of the acetate group, but it does not appear as though acetic acid is stripped out quantitatively.

Since certain changes may be made in the above processes without departing from the scope of the invention herein involved, it is intended that all matter contained in the above description or shown in the accompanying drawing shall be interpreted as illustrative and not in a limiting sense.

What is claimed is:

1. A process of forming a colored image which comprises treating a film comprising at least one copolymer of a first vinyl monomer corresponding to the formula:

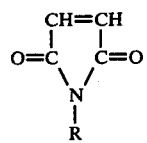

wherein R is selected from the group consisting of hydrogen and monovalent organic groups; and a second vinyl monomer which has a radical capable of forming a stable anion directly attached to at least one carbon of the carbon-carbon double bond; with an imagewise distribution of a base selected from the group consisting of ammonia and organic amines whose basic ionization constant is at least as large as that of ammonia.

2. A process as defined in claim 1 wherein R is selected from the group consisting of hydrogen and monovalent aliphatic organic groups, the atom of said radical directly attached to at least one carbon of said carbon-carbon double bond of said second vinyl monomer is selected from the group consisting of oxygen, nitrogen, halogen and sulfur, and said base is selected from the group consisting of ammonia and organic aliphatic amines whose basic ionization constant is at least as large as that of ammonia.

3. A process of forming a colored image which comprises:
  (a) forming a film comprising:
    (1) at least one copolymer of a first vinyl monomer corresponding to the formula:

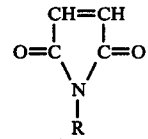

wherein R is selected from the group consisting of hydrogen and monovalent organic groups, and a second vinyl monomer which has a radical capable of forming a stable anion directly attached to at least one carbon of the carbon-carbon double bond; and
    (2) an amine salt which is capable of liberating a free amine upon heating, said free amine having a basic ionization constant at least as large as that of ammonia; and
  (b) heating said film whereby said amine is liberated and reacts with said copolymer in said film thereby forming said colored image.

4. A process of forming a colored image by diffusion transfer which comprises, in combination, the steps of:
  (a) exposing a photographic film unit which comprises a plurality of layers including a support layer carrying a photosensitive silver halide layer having associated therewith a compound capable of providing, as a function of silver halide development, an imagewise distribution of an image-forming material, said compound being processing composition soluble and diffusible as a function of the point-to-point degree of exposure of said silver halide layer, and comprising an organic amine whose basic ionization constant is at least as large as that of ammonia, attached to a silver halide developing moiety;
  (b) contacting said photographic film unit with an aqueous alkaline processing composition forming thereby an imagewise distribution of diffusible image-forming material as a function of the point-to-point degree of emulsion exposure; and
  (c) transferring, by diffusion, at least a portion of said imagewise distribution of diffusible image-forming material to a layer comprising a copolymer of a first vinyl monomer corresponding to the formula

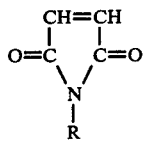

wherein R is selected from the group consisting of hydrogen and monovalent organic groups, and a second vinyl monomer which has a radical capable of forming a stable anion directly attached to at least one carbon of the carbon-carbon double bond.

5. A process as defined in claim 4 wherein R is selected from the group consisting of hydrogen and monovalent aliphatic organic groups, the atom of said radical directly attached to at least one carbon of said carbon-carbon double bond of said second vinyl monomer is selected from the group consisting of oyxgen, nitrogen, halogen and sulfur, and said amine is an organic aliphatic amine whose basic ionization constant is at least as large as that of ammonia.

* * * * *